United States Patent
Hamilton et al.

(10) Patent No.: US 8,635,124 B1
(45) Date of Patent: Jan. 21, 2014

(54) MESSAGE BASED GENERATION OF ITEM LISTINGS

(71) Applicants: Scot Fraser Hamilton, Dublin, CA (US); Matthew Olson, San Jose, CA (US); Vikas Singh, San Jose, CA (US); Sean Gates, San Jose, CA (US)

(72) Inventors: Scot Fraser Hamilton, Dublin, CA (US); Matthew Olson, San Jose, CA (US); Vikas Singh, San Jose, CA (US); Sean Gates, San Jose, CA (US)

(73) Assignee: eBay, Inc., San Jose, CA (US)

( * ) Notice: Subject to any disclaimer, the term of this patent is extended or adjusted under 35 U.S.C. 154(b) by 0 days.

(21) Appl. No.: 13/687,807

(22) Filed: Nov. 28, 2012

(51) Int. Cl.
*G06Q 30/00* (2012.01)

(52) U.S. Cl.
USPC .................. 705/27.1; 705/26.1; 705/27.2

(58) Field of Classification Search
USPC ............................... 705/26.1–27.2
See application file for complete search history.

(56) References Cited

U.S. PATENT DOCUMENTS

| | | | |
|---|---|---|---|
| 2002/0128923 A1* | 9/2002 | Dale .............................. | 705/26 |
| 2003/0083961 A1* | 5/2003 | Bezos et al. .................. | 705/27 |
| 2009/0012878 A1* | 1/2009 | Tedesco et al. ............... | 705/27 |
| 2009/0106127 A1* | 4/2009 | Purdy et al. ................... | 705/27 |

OTHER PUBLICATIONS

Macdonald, C. (2000). E-commerce a hit with resin suppliers. Canadian Plastics, 58(1), 31-34.*

* cited by examiner

*Primary Examiner* — Resha Desai
(74) *Attorney, Agent, or Firm* — Schwegman Lundberg & Woessner, P.A.

(57) ABSTRACT

According to various exemplary embodiments, an electronic text message is received from a source telephone number, the electronic text message including content describing a product item. A seller of the product item is identified, based on the source telephone number, and the product item is identified, based on the content included in the electronic text message. Thereafter, a draft version of an item listing is automatically generated, where the item listing lists the product item as being for sale by the seller on a marketplace website.

20 Claims, 20 Drawing Sheets

| SELLER NAME | SELLER TELEPHONE NUMBER | SELLER ADDRESS |
|---|---|---|
| Alice Smith | 123-456-7890 | 110 Main Street, Ann Arbor, MI |
| Bob Smith | 123-999-0000 | 20 State Street, San Francisco, CA |
| John Doe | 987-654-3210 | 999 Washington Street, New York, NY |
| ⋮ | ⋮ | ⋮ |
| ⋮ | ⋮ | ⋮ |
| ⋮ | ⋮ | ⋮ |

*Fig. 5*

| CONDITION KEYWORDS |
|---|
| Mint |
| Near Mint |
| New |
| Like New |
| Excellent |
| Very Good |
| Good |
| Used |
| Acceptable |
| Minor wear |
| Manufacturer Refurbished |
| Seller Refurbished |
| For parts / not working |
| ... |

*Fig. 9a*

| QUANTITY KEYWORDS | |
|---|---|
| Quantity | Synonyms |
| 1 | one |
| 2 | two |
| 3 | three |
| 4 | four |
| 5 | five |
| 6 | six, half dozen |
| ... | |

*Fig. 9b*

SELLER LOGIN

Username: [ ]

Password: [ ]

[Submit]  [Cancel]

*Fig. 18a* — 1800

SELLER PROFILE

Username: asmith                                        Edit

Name: Alice Smith                                       Edit

Address: 110 Main Street, Ann Arbor, MI     Edit

Please enter telephone number:

[123-456-7890▮]   [OK]

[See My Item Listings]

*Fig. 18b* — 1801

MESSAGE BASED GENERATION OF ITEM LISTINGS

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2012, All Rights Reserved.

TECHNICAL FIELD

The present application relates generally to the technical field of electronic data and, in one specific example, to message based generation of item listings.

BACKGROUND

Marketplace websites allow sellers to post various product items for sale online. Typically, the seller logs into the marketplace website and manually generates an item listing that describes the product item that the seller wishes to sell. Thereafter, the item listing may be posted on the marketplace website for others to view.

BRIEF DESCRIPTION OF THE DRAWINGS

Some embodiments are illustrated by way of example and not limitation in the figures of the accompanying drawings in which:

FIG. 5 illustrates examples of seller records, according to various exemplary embodiments.

FIG. 9a illustrates an example of condition keyword information, according to various exemplary embodiments.

FIG. 9b illustrates an example of quantity keyword information, according to various exemplary embodiments.

FIGS. 18a and 18b illustrate examples of user interfaces, according to various embodiments.

DETAILED DESCRIPTION

Example methods and systems for message based generation of item listings are described. In the following description, for purposes of explanation, numerous specific details are set forth in order to provide a thorough understanding of example embodiments. It will be evident, however, to one skilled in the art that the present invention may be practiced without these specific details.

Figure 1:
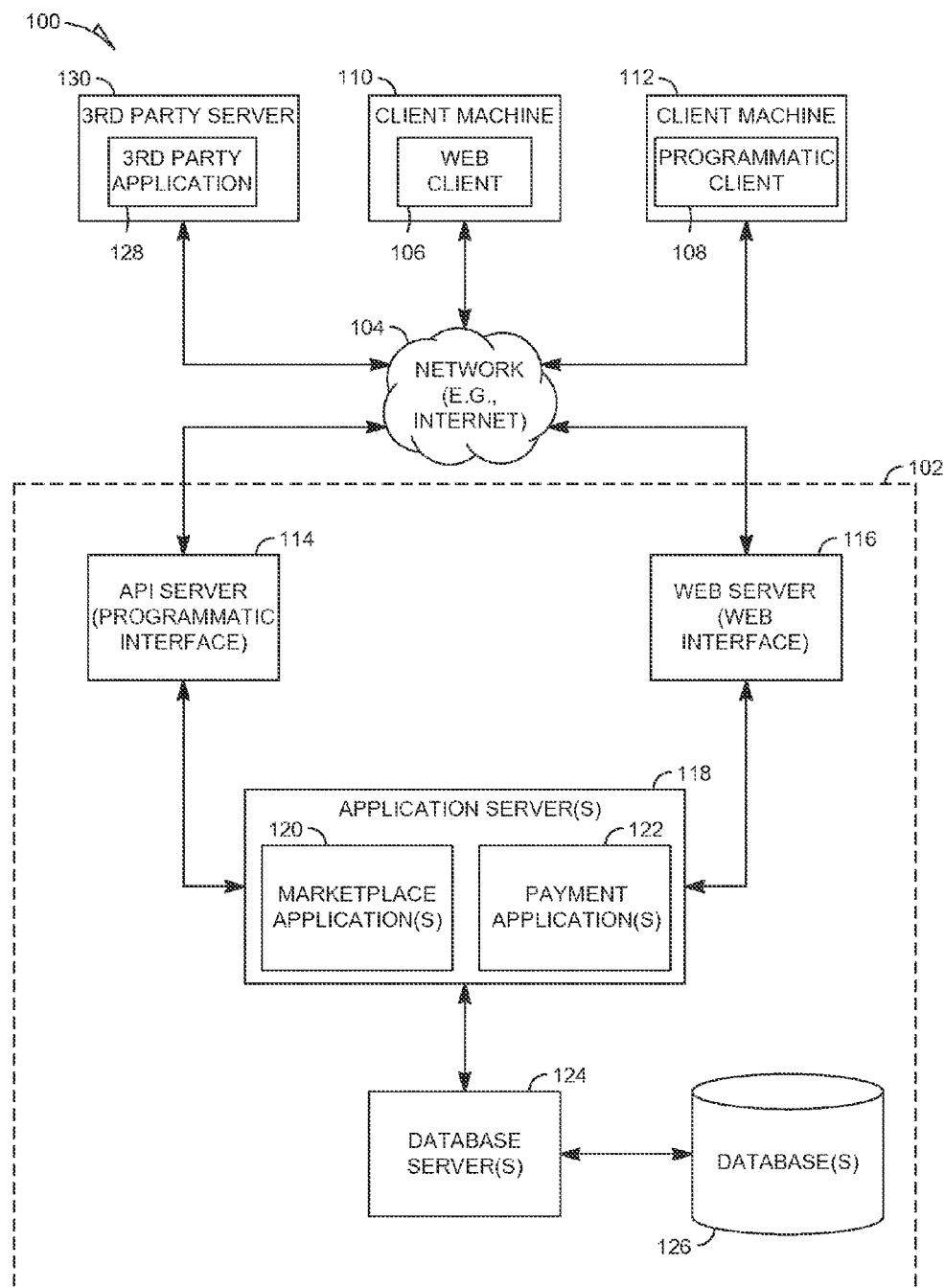
FIG. 1 is a network diagram depicting a client-server system, within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
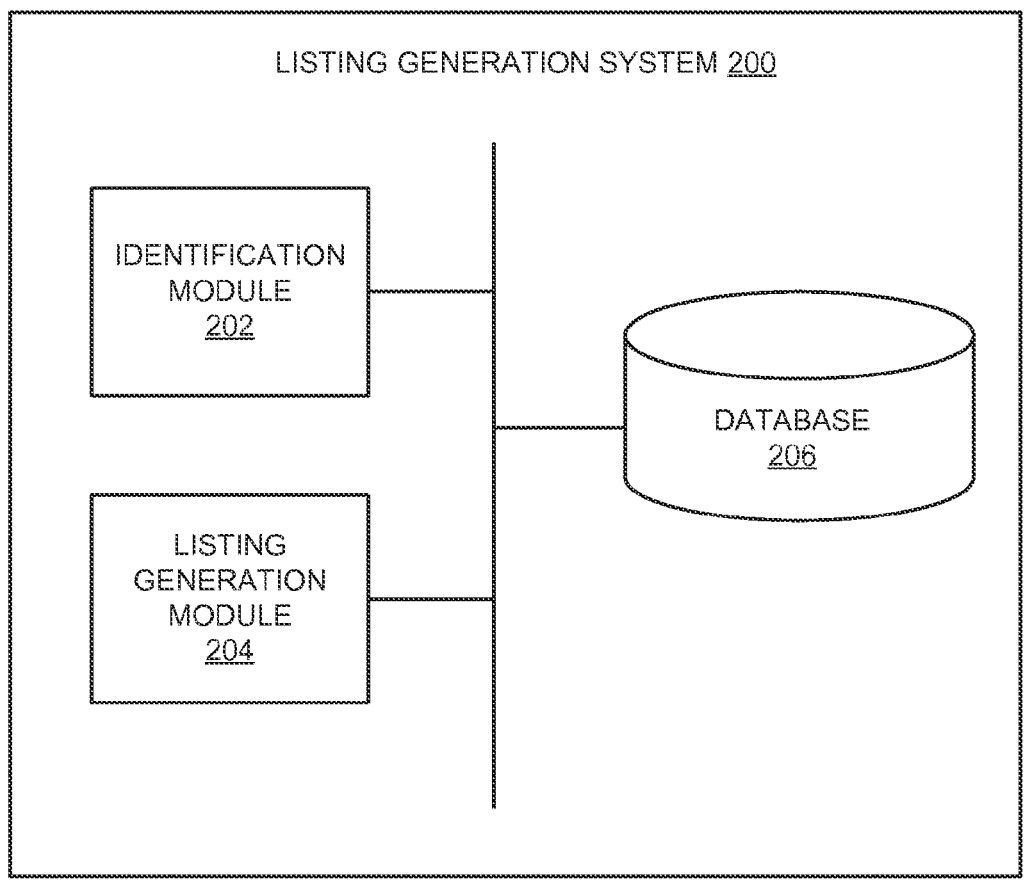
FIG. 2 is a block diagram of an example system, according to various embodiments.

Turning now to FIG. 2, a listing generation system 200 includes an identification module 202, a listing generation module 204, and a database 206. The modules of the listing generation system 200 may be implemented on a single device such as an item listing generation device, or on separate devices interconnected via a network. The aforementioned item listing generation device may correspond to, for example, one of the client machines (e.g. 110, 112) or application server(s) (e.g., 118) illustrated in FIG. 1.

According to various exemplary embodiments described herein, a seller may text a photo of an item to a predetermined telephone number, along with a short description of the item. The listing generation system 200 receives the text message, and automatically generates an item listing for the seller to sell the photographed item on a marketplace website. More specifically, the listing generation system 200 analyzes the contents of the text message and determines various information regarding the seller and the photographed item, such as: seller identity, product title, product classification, product quantity, product condition, suggested sale price, suggested shipping cost, and so forth. The listing generation system 200 then automatically generates a draft version of an item listing corresponding to the photographed item, and the item listing may thereafter be uploaded/posted to a marketplace website.

Figure 3:
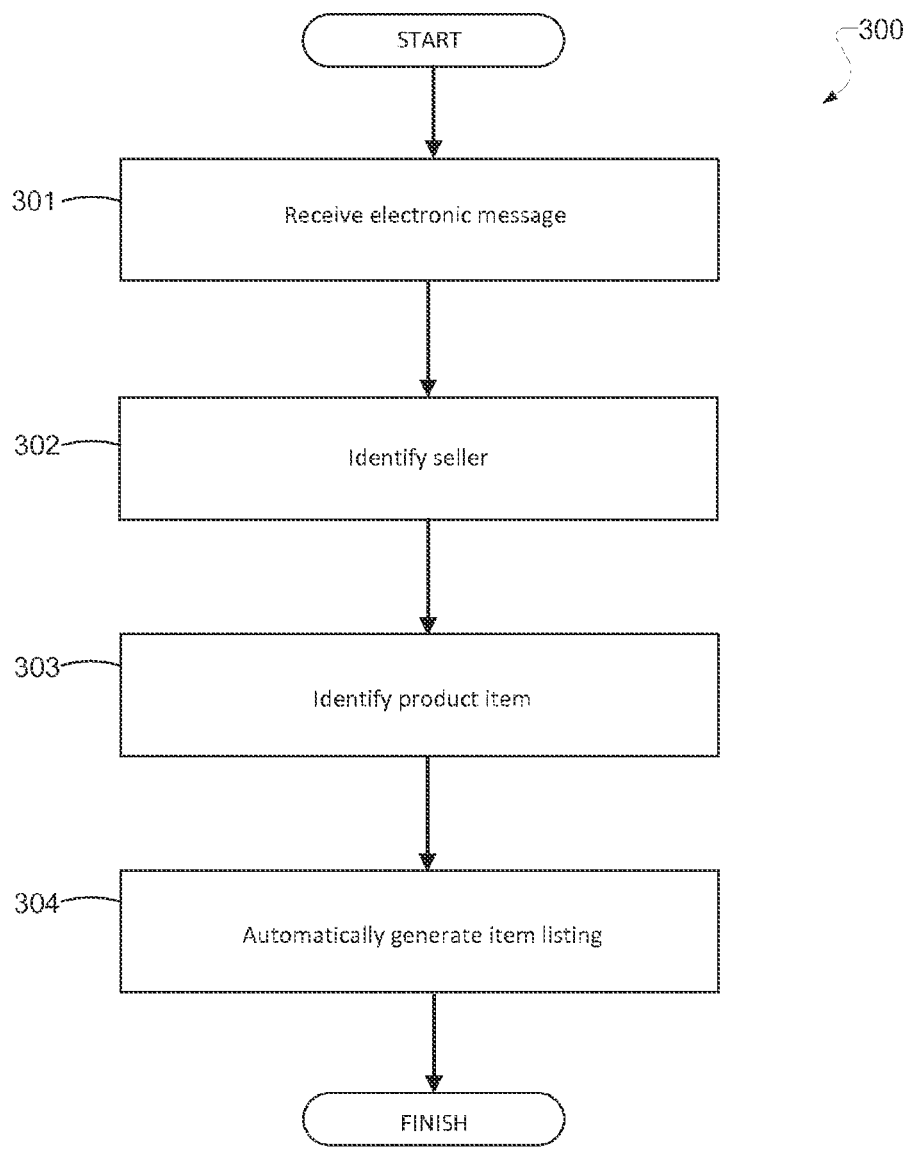
FIG. 3 is a flowchart illustrating an example method, according to various embodiments.

For example, FIG. 3 is a flowchart illustrating an example method 300, according to various embodiments. The method 300 may be performed at least in part by, for example, the listing generation system 200 illustrated in FIG. 2 (or an apparatus having similar modules, such as client machines 110 and 112 or application server 112 illustrated in FIG. 1). In 301, the identification module 202 receives an electronic text message from a source telephone number, the electronic text message including content describing a product item. In 302, the identification module 202 identifies a seller of the product item, based on the source telephone number. In 303, the identification module 202 identifies the product item, based on the content included in the electronic text message. In 304, the listing generation module 204 automatically generates a draft version of an item listing that lists the product item as being for sale by the seller on a marketplace website. Each of the aforementioned operations in the method 300 illustrated in FIG. 3, and each of the aforementioned modules of the listing generation system 200 illustrated in FIG. 2, will now be described in more detail.

As described throughout this disclosure, an electronic text message (commonly referred to as an "SMS", "text", or "text message") is an electronic message transmitted over a phone network between two or more fixed or portable devices (such as fixed landline phones, mobile phones and smart phones). Two common types of electronic text messages are Short Message Service (SMS) messages and Multimedia Messaging Service (MMS) messages. SMS messages form a text messaging service component of phone, web, or mobile communication systems, using standardized communications protocols that allow the exchange of short text messages (generally of up to 160 characters in length) between fixed line or mobile phone devices. MMS messages may further contain multimedia content (such as image, video, and sound content) that may be communicated between phone devices. Electronic text messages (including SMS messages and MMS messages) are well understood by those skilled in the art, and will not be described in further detail in the interests of brevity.

Referring again to FIG. 3, in 301, the identification module 202 receives an electronic text message from a source telephone number, the electronic text message including content describing a product item. For example, when a seller wishes to sell a particular product item, the seller may take a photo of the item using the camera of their smartphone, and then text the photo to a predetermined telephone number associated with the listing generation system 200 (e.g., "1-EBAY-LIST-THIS"). The seller may also include a short description of the photographed item in the text message. The identification module 202 is configured to receive all text messages directed to the aforementioned telephone number associated with the listing generation system 200. Thus, the identification module 202 receives this electronic text message from the seller, where the source telephone number of the received text message corresponds to the telephone number of the seller. The content included in the electronic text message may include, for example, a picture of the product item and a short description (e.g., one or more words) describing the product item.

Figure 4:
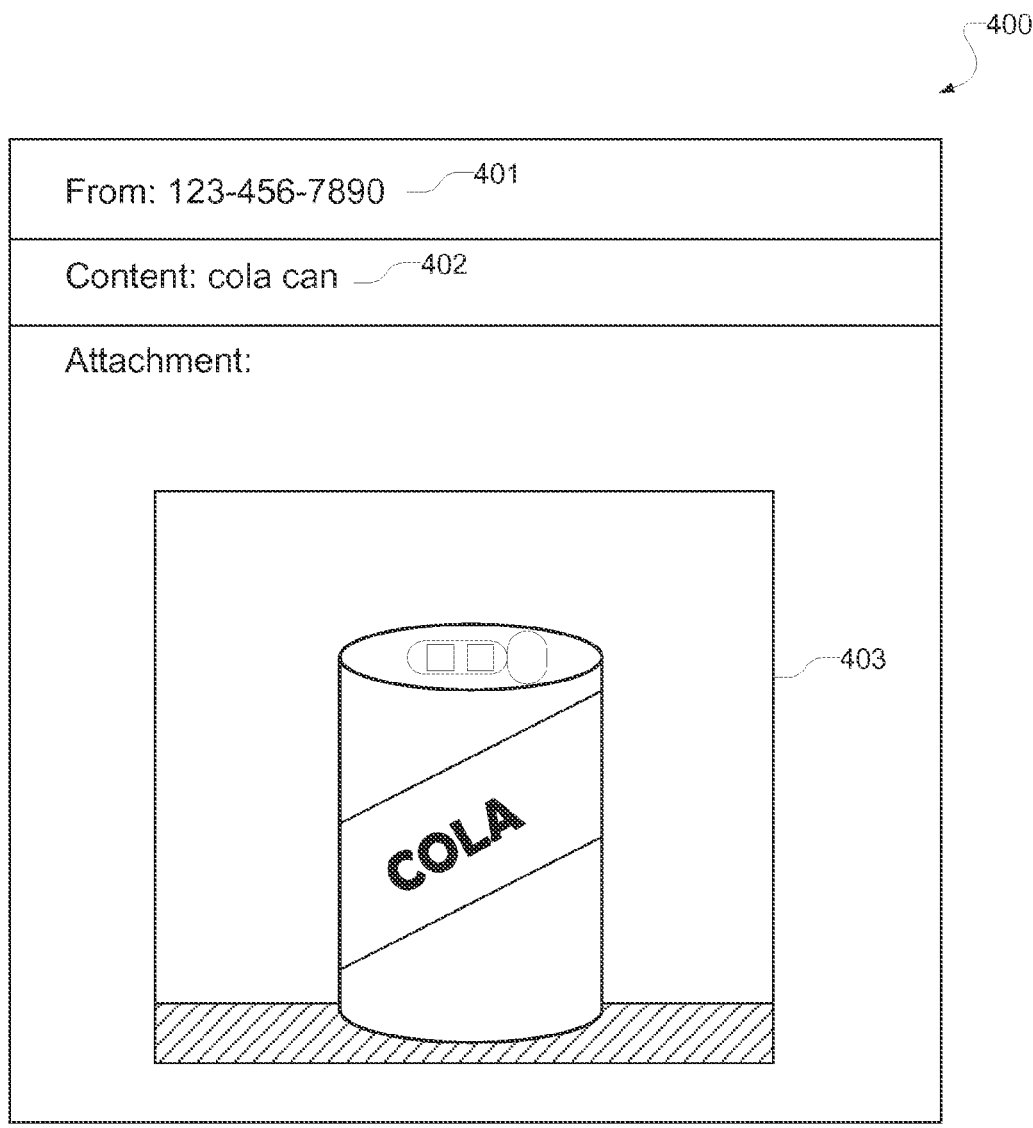
FIG. 4 illustrates an example of a text message, according to various exemplary embodiments.

FIG. 4 illustrates an example portion of a text message 400 (e.g., an MMS message) that is received by the identification module 202 from a seller. The text message 400 indicates a source telephone number 401 (i.e., "123-456-7890") from which the text message 400 was transmitted. Thus, in this example, the source telephone number 401 also corresponds to a seller telephone number of a seller. The example text message 400 also includes various content describing a particular product item—namely, a cola can. In particular, the text message 400 includes textual content 402 including the words "cola can", and an attached picture/photo 403 of a cola can. The attached picture may correspond to electronic image data (e.g., Tagged-Image File Format or TIFF images, Joint Photographic Experts Group or JPEG images, etc.) generated when the seller took a photograph of the cola can with their smartphone, which may be the same smartphone from which the text message 400 was transmitted (i.e. the smart phone associated with the source telephone number 123-456-7890).

Referring back to FIG. 3, in 302, after the identification module 202 receives the electronic text message, the identification module 202 identifies a seller of the product item described in the electronic text message, based on the source telephone number associated with the electronic text message. For example, if the listing generation system 200 receives the text message 400, the identification module 202 extracts the source telephone number 123-456-7890 associated with a text message 400, and determines a seller associated with this source telephone number 123-456-7890.

According to an exemplary embodiment, the identification module 202 may access seller records associated with various sellers. For example, a marketplace website may maintain seller records for sellers having accounts with the marketplace website, where the seller records identify each seller's name, address, and telephone number. FIG. 5 illustrates an example of seller records 500 of sellers Alice Smith, Bob Smith, and John Doe. The seller records 500 may be stored in one or more data tables or similar data structures, which may be located in a data repository or database (such as database 206 illustrated in FIG. 2). As illustrated in FIG. 5, the source telephone number "123-456-7890" extracted from the text message 400 is associated with the seller "Alice Smith". Accordingly, the identification module 202 may identify the seller of the product item (i.e., the cola can) described in the text message 400 as the seller Alice Smith. Thus, the identification of the seller comprises detecting a match between the source telephone number in the received electronic text message and a seller telephone number associated with the seller, where the seller telephone number is included in a seller record corresponding to the seller.

Thereafter, in 303 in FIG. 3, the identification module 202 identifies the product item described in the electronic text message, based on the content included in the electronic text message. For example, since the text message 400 includes the words "cola can", the identification module 202 may utilize this information in order to identify the product item as a cola can. According to an exemplary embodiment, text content in the electronic text message are analyzed as keywords, and the identification module 202 compares these keywords in the content of the electronic text message with a database of known keywords associated with various candidate product items. If the identification module 202 detects a match between the keywords in the text message and one of the known keywords that are associated with a specific candidate product item, then the identification module 202 may determine that this specific candidate product item is the subject of the text message.

Figure 6:
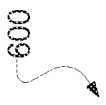
FIG. 6 illustrates exemplary product identification information, according to various exemplary embodiments.

For example, FIG. 6 illustrates product identification information 600 identifying a number of candidate product items (e.g., Cola Can, Apl ePad, Batman comic #152, Audi R8 V10, etc.), and product classifications associated with each of these product items. Many marketplace websites include a classification system for classifying a wide range of product items that may be listed for sale in the marketplace website. Such a classification system may include a hierarchical structure with different levels of classifications, including broad classifications or categories (e.g., "fashion", "home outdoors and décor", "electronics", "automotive", "sporting goods", "collectibles & antiques") and various levels of progressively narrower classifications or categories therein (e.g., within the "electronics" classification maybe the sub-classifications "cameras and photography", "computers and tablets", "cell phones and accessories", "TV and audio", "video games and consoles", and so forth), as understood by those skilled in the art. Thus, the product identification information 600 may include such product classifications associated with each of these product items. For example, as illustrated in FIG. 6, a classification for the Cola Can product item is Collectibles>Advertising>Soda>Cola>Cans, a classification for the product item Apl ePad is Computers/Tablets & Networking>Tablets & eBook Readers, and so forth.

The product identification information 600 also lists, for each of the product items, a number of known keywords associated with that product item. When a seller is attempting to identify a particular product item they wish to sell, they are most likely to describe that product item using these known keywords associated with that product item. For example, the Cola Can product item is associated with the known keywords "cola, coke, soda, can", etc., while the Audi R8 V10 product item is associated with the keywords "audi, R8, car, supercar, V10", etc.

Accordingly, the identification module 202 compares the keywords in the content of the electronic text message 400 with the known keywords associated with the candidate product items in the product identification information 600. If the identification module 202 detects a match between the keywords in the text message 400 (e.g., "cola can") and one or more of the known keywords (e.g., "cola, coke, soda, can") that are associated with a specific candidate product items (e.g., "Cola Can") in the product identification information 600, then the identification module 202 may determine that this specific candidate product item of "Cola Can" is the subject of the text message. According to an exemplary embodiment, the product item in the product identification information 600 that is the strongest match with the keywords in the received electronic text message is determined by the identification module 202 to be the subject of the electronic text message. For example, when a given product item in the product identification information 600 has more known keywords that match with the keywords in the electronic text message (in comparison to the other product items in the product identification information 600), then this given product item is determined by the identification module 202 to be the subject of the electronic text message.

According to an example embodiment, the identification module 202 may identify the product item that is the subject of the received electronic text message 400 by analyzing the picture 403 included in the message 400. For example, the identification module 202 may perform a character or object image recognition process on the picture 403 to detect, for example, any characters and keywords included in the picture 403. For instance, it is possible that such characters or keywords may be included in a logo or a label attached to the photographed product item. Any detected characters or keywords may be compared with the keywords in the product identification information 600, in order to identify the appropriate product item as described above.

After the identification module 202 determines at least a seller (in 302 in FIG. 3) and a product item (in 303 in FIG. 3) associated with the received electronic text message 400, then, in 304 in FIG. 3, the listing generation module 204 automatically generates a draft version of a marketplace website item listing associated with the product item and the seller. More specifically, the item listing generated by the listing generation module 204 lists the product item as being for sale by the seller on a marketplace website. For example, as described above, after the identification module 202 receives the example text message 400 (see FIG. 4), the identification module 202 determines a seller associated with the electronic text message 400 (i.e., seller "Alice Smith"), as well as the product item (e.g., "Cola Can") and associated product classification (e.g., "Collectibles>Advertising>Soda>Cola>Cans") that is the subject of this electronic text message 400. Accordingly, the listing generation module 204 generates an item listing that lists a Cola Can as being for sale by the seller Alice Smith. The draft version of the item listing may be manifested as electronic data stored in a database, such as database 206 illustrated in FIG. 2. The draft version of the item listing may be stored in association with the seller records 500 of the seller that transmitted the electronic text message 400 (i.e., the seller determined in 302 in FIG. 3).

Figure 7:
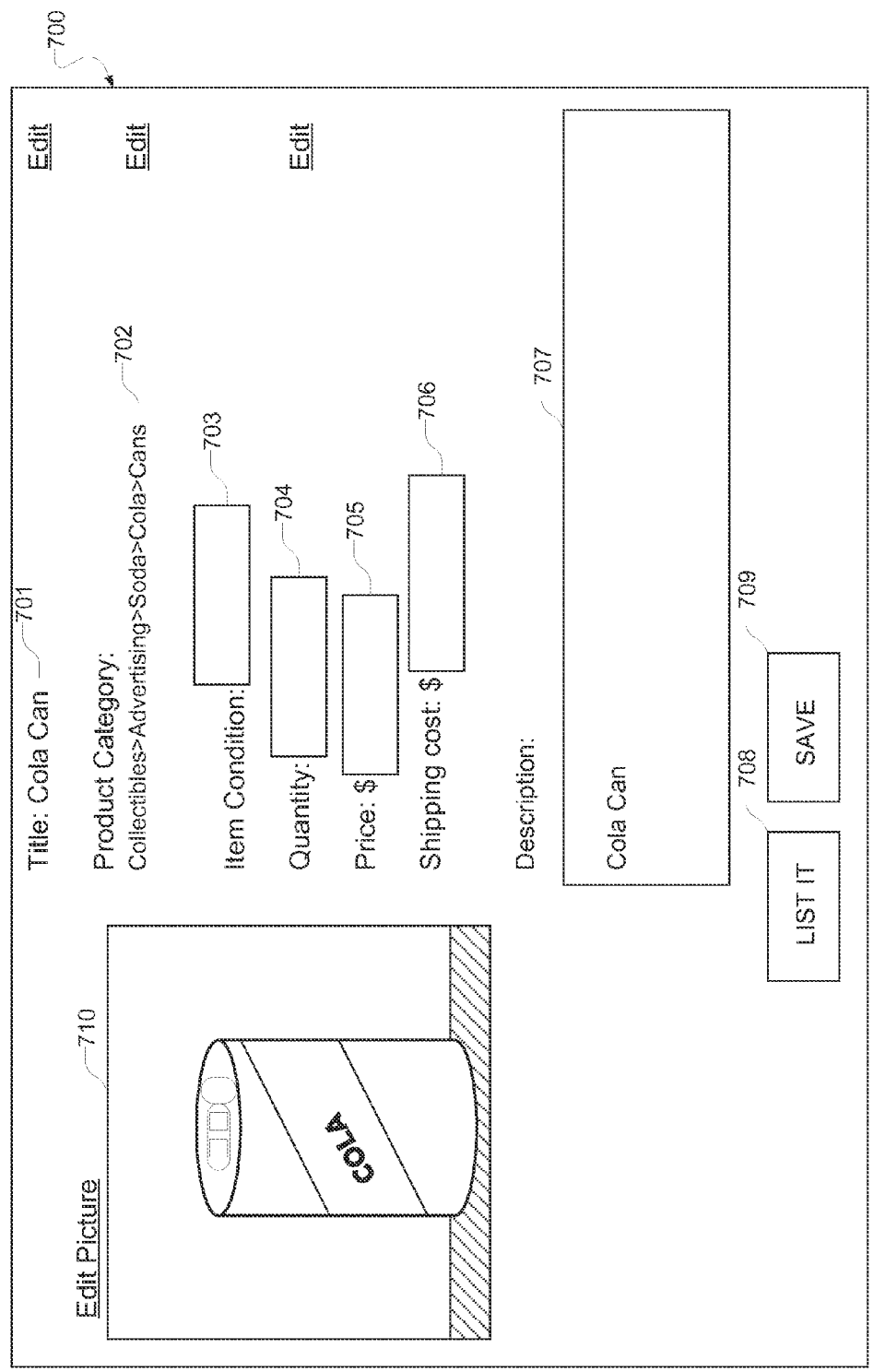
FIG. 7 illustrates a draft version of an exemplary item listing, according to various exemplary embodiments.

When the seller logs into the listing generation system 200, the seller may view a representation of the draft version of the item listing. The aforementioned representation may be in the form of, for example, an item listing creation/edit page with various item listing fields already prefilled by the listing generation module 204. For example, FIG. 7 illustrates an example portion of a user interface displayed by the listing generation module 204 to a logged in seller, where the user interface depicts a representation of a draft version of an item listing 700, in the form of an item listing creation/edit page. As illustrated in FIG. 7, various fields of the item listing 700 have been already prefilled by the listing generation module 204 for the convenience of the seller, based on the information included in the received text message 400. For example, the item listing 700 includes a prefilled product title 701 (e.g., "Cola Can"), product classification 702 (e.g., "Collectibles>Advertising>Soda>Cola>Cans"), and description 707 corresponding to the text included in the original electronic text message 400 (e.g., "Cola Can"). Moreover, the listing generation module 204 has extracted the electronic image 403 from the received electronic text message 400 (see FIG. 4), and has inserted this electronic image into the draft version of the item listing 700, as a picture 710 of the "Cola Can" product item.

As illustrated in FIG. 7, the seller may edit the fields in the item listing creation/edit webpage that are prefilled by the listing generation module 204, including product title 701, product classification 702, description 707, and picture 710. Moreover, the seller may enter additional information into various other fields. For example, the seller may specify a product condition 703, product quantity 704, sale price 705, shipping price 706, and so on, and the listing generation module 204 will update the draft version of the item listing 700 accordingly. If the seller selects the "Save It" button 709, the draft version of the item listing 700 is saved, so that the seller may further edit the draft version of the item listing 700 during the current login session or a subsequent log in session.

Figure 8:
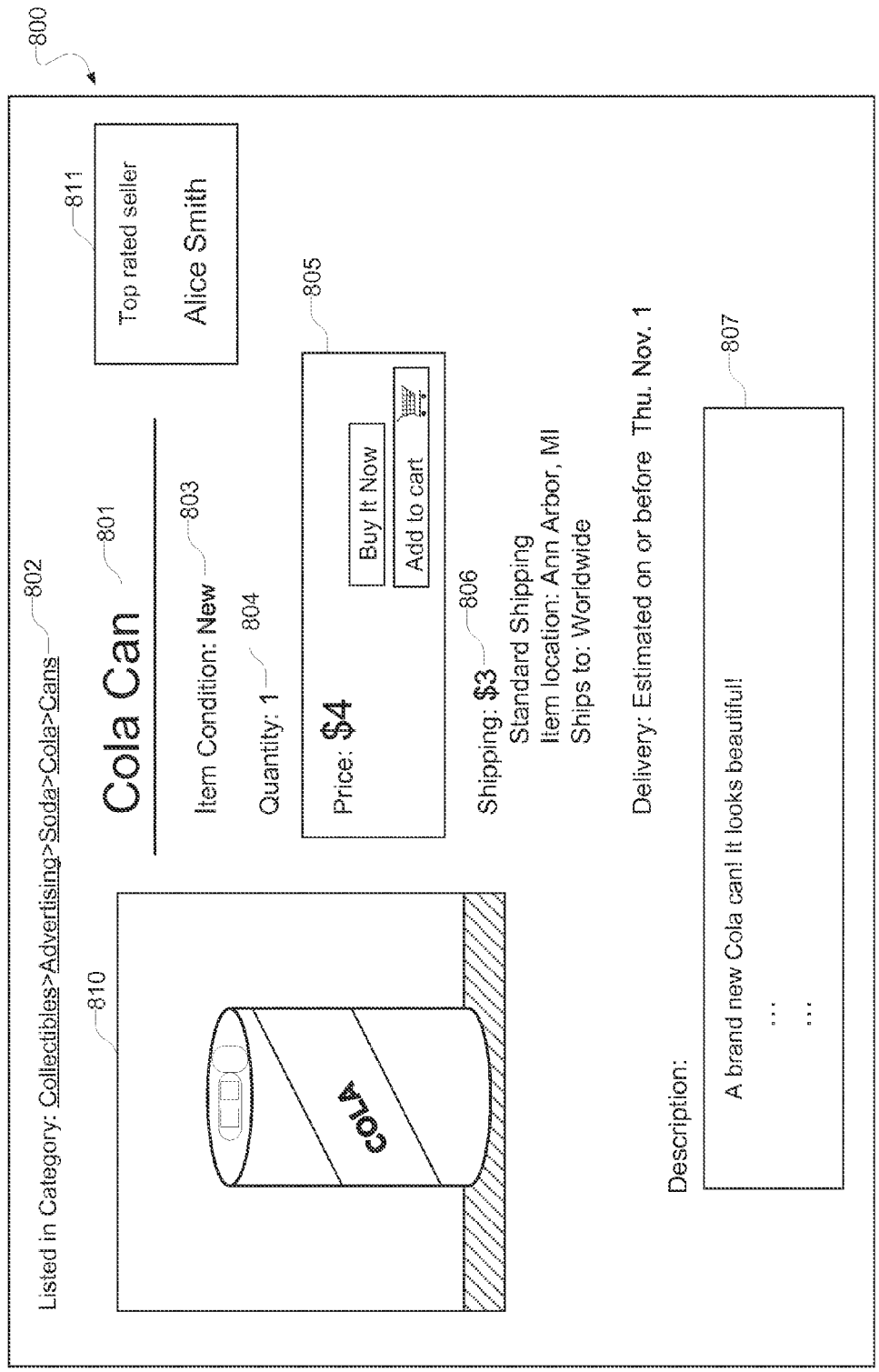
FIG. 8 illustrates an exemplary item listing, according to various exemplary embodiments.

If the seller selects the "List It" button 708, the draft version of the item listing 700 is uploaded/posted to the marketplace website for other users to view as a complete item listing. For example, suppose the seller viewing the draft version of the item listings 700 in FIG. 7 edits the item listing 700 by specifying a condition 703 of "New", a quantity 704 of "1", sale price 705 of "$4", a shipping price 706 of "$3", and a description 707 of "A brand new Cola can! It looks beautiful!", and then selects the "List It" button 708. The resulting uploaded version of the item listing 800, as viewed by visitors of the marketplace website, is illustrated in FIG. 8. The item listing 800 includes various fields such as product title 801, product classification 802, condition 803, quantity 804, sale price 805, shipping price 806, description 807, picture 810, and an identification of the seller 811. The values of the aforementioned fields 801-807 and 810 are specified by the seller via the item listing creation/edit page illustrated in FIG. 7, as described above. The identification of the seller 811 is determined by the determination module 204 as describe above (see 302 in FIG. 3).

Thus, according to various exemplary embodiments, information included in an electronic text message transmitted by a seller is utilized to automatically generate a draft version of an item listing. Thus, the work load of the seller is significantly reduced, since the seller does not have to manually generate various components of an item listing. For example, the seller does not need to manually upload a picture of a product item from the seller's computer, or enter a title of the product item, or manually designate a classification of the product item, and so on.

As described above, the identification module 202 identifies at least a product item described in the received text message and a seller of the product item, in order for the listing generation module 204 to generate a draft version of an item listing for the sale of the product item by the seller. According to various further exemplary embodiments, the identification module 202 may identify other information from the received text message that may be automatically included in the draft version of the item listing.

According to an aspect, the identification module 202 may identify a condition of the product item, based on "condition keywords" included in the content of the received text message that describe a condition of the product item. Examples of condition keyword to include mint, near mint, new, like new, excellent, etc. For example, FIG. 9a illustrates an example of condition keyword information 900 that may be accessed by the identification module 202 and the listing generation module 204, where the condition keyword information 900 includes known condition keywords, such as: mint, near mint, new, like new, excellent, very good, etc. When the identification module 202 receives a text message, the identification module 202 analyzes the words included in the text message to determine if any of them match one of the condition keywords included in the condition keyword information 900. If there is a match, then the listing generation module 204 may utilize the matched condition keywords when generating the draft version of the item listing 700. More specifically, the listing generation module 204 may pre-fill the condition field 703 of the draft version of the item listing 700 (see FIG. 7), based on the matched condition keyword. For example, if the received text message includes the words "1 new cola can", the identification module 202 will determine that the word "new" in the received text message matches the condition keyword "new" in the condition keyword information 900. Accordingly, the listing generation module 204 will pre-fill the condition field 703 of the draft version of the item listing 700 with the word "new", as illustrated in the enhanced draft version of the item listing 700A illustrated in FIG. 11. The condition keyword information 900 may be stored in one or more data tables or similar data structures, which may be located in a data repository or database (such as database 206 illustrated in FIG. 2).

According to another aspect, the identification module 202 may identify an applicable quantity of the product item, based on "quantity keywords" included in the content of the received text message that describe a quantity of the product item(s). For example, FIG. 9b illustrates an example of quantity keyword information 901 that may be accessed by the identification module 202 and the listing generation module 204, where the quantity keyword information 900 includes known quantity keywords/characters such as 1, 2, 3, etc., as well as synonymous quantity keywords (e.g., one, two, three, etc.,) associated with each of the aforementioned keywords/characters. When the identification module 202 receives a text message, the identification module 202 analyzes the words included in the text message to determine if any of them match one of the quantity keywords included in the quantity keyword information 901. If there is a match, then the listing generation module 204 may utilize the matched quantity keyword when generating the draft version of the item listing 700. More specifically, the listing generation module 204 may pre-fill the quantity field 704 of the draft version of the item listing 700 (see FIG. 7), based on the matched quantity keyword. For example, if the received text message includes the words "1 new cola can", the identification module 202 will determine that the character "1" in the received text message matches the quantity keyword/character "1" in the condition keyword information 900. Accordingly, the listing generation module 204 will pre-fill the quantity field 704 of the draft version of the item listing 700 (see FIG. 7) with the quantity "one" or "1", as illustrated in the enhanced draft version of the item listing 700A illustrated in FIG. 11. The quantity keyword information 901 may be stored in one or more data tables or similar data structures, which may be located in a data repository or database (such as database 206 illustrated in FIG. 2).

Figure 10:
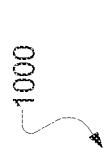
FIG. 10 illustrates an example of suggested pricing information, according to various exemplary embodiments.

According to another aspect, the identification module 202 may determine a suggested sale price or suggested shipping cost of the product item, based on suggested pricing information indicating suggested sale prices and suggested shipping costs for a variety of candidate product items. For example, FIG. 10 illustrates an example of suggested pricing information 1000 that may be accessed by the identification module 202 and the listing generation module 204. The suggested pricing information 1000 identifies various products (e.g., Cola Can, Apl ePad, Batman comic #152, Audi R8 V10 etc.), and suggested prices and suggested shipping costs associated with each of these products. In an embodiment, the suggested pricing information 1000 may include suggested sale prices for various different versions of a particular product. For example, the suggested pricing information 1000 includes different suggested sale prices for different ePad models (e.g., having different colors and/or capabilities). As another example, the suggested pricing information 1000 includes different suggested sale prices for different conditions of the Batman comic #152. As another example, the suggested pricing information 1000 includes different suggested sale prices for different year models of the Audi R8 V10. Thus, it is apparent that various embodiments having various types of suggested pricing information may be implemented.

Accordingly, after the identification module 202 identifies the product item that is the subject of the received text message (see 303 of FIG. 3 described above), the identification module 202 locates the identified product item in the suggested pricing information 1000. If there is a match, then the identification module 202 may retrieve the relevant suggested sale price and suggested shipping cost, which may be utilized by the listing generation module 204 to supplement the draft version of the item listing 700. More specifically, the listing generation module 204 may pre-fill the price field 705 and shipping cost field 706 of the draft version of the item listing 700 (see FIG. 7), based on the retrieved suggested sale price and suggested shipping cost. For example, if the identification module 202 identifies the product described in a received text message stating "1 new cola can" as a cola can, the listing generation module 204 will retrieve the suggested sale price of $4 and the suggested shipping cost of $3 from the suggested pricing information 1000 illustrated in FIG. 10. Accordingly, the listing generation module 204 will pre-fill the price field 705 of the draft version of the item listing 700 with "$4", and the shipping cost field 706 of the draft version of the item listing 700 with "$3", as illustrated in the enhanced draft version of the item listing 700A illustrated in FIG. 11. The suggested pricing information 1000 may be stored in one or more data tables or similar data structures, which may be located in a data repository or database (such as database 206 illustrated in FIG. 2).

Figure 11:
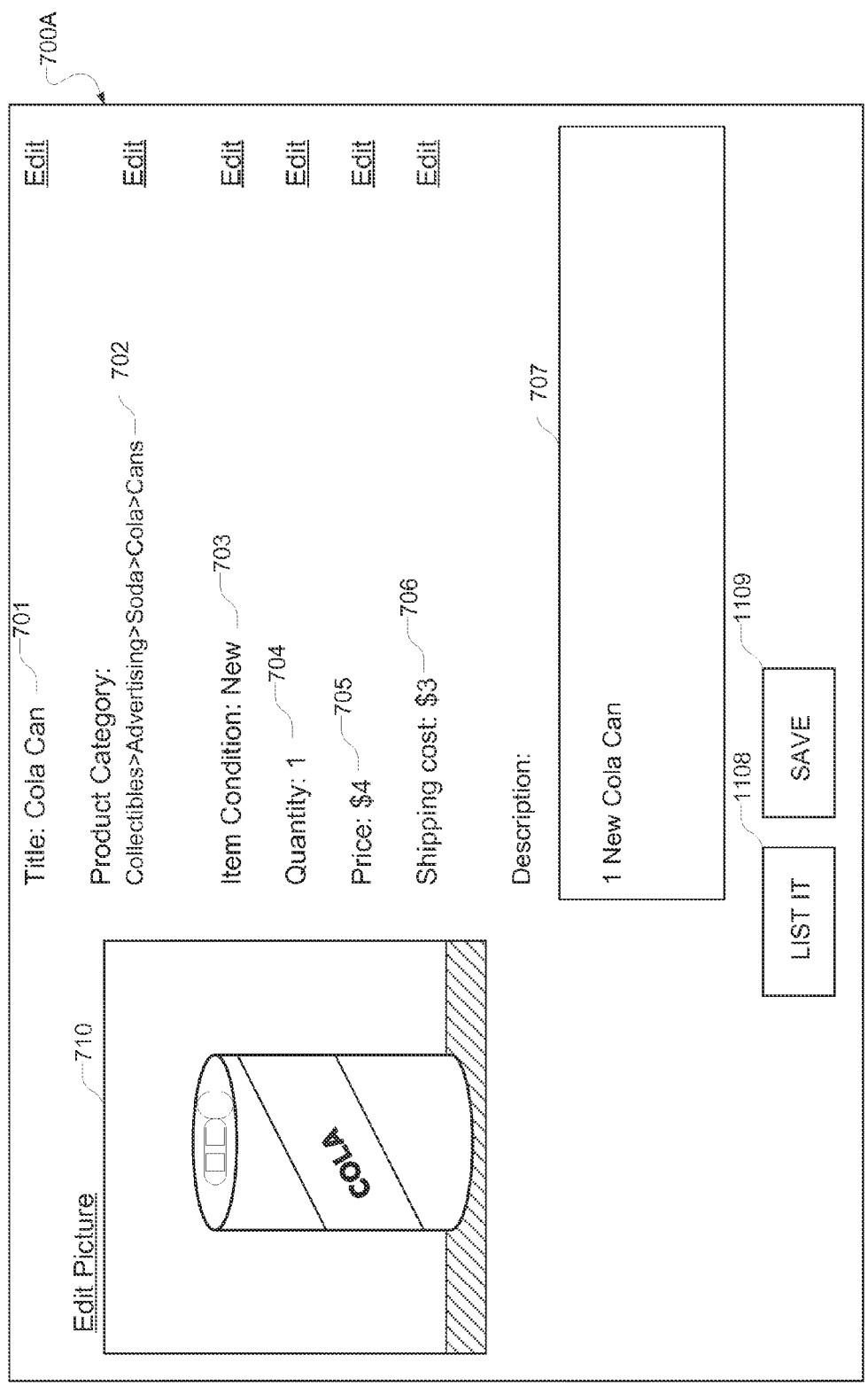
FIG. 11 illustrates a draft version of an exemplary item listing, according to various exemplary embodiments.

If the seller selects the "List It" button 708 in FIG. 11, the draft version of the item listing 700A is uploaded/posted to the marketplace website for other users to view. The resulting uploaded version of the item listing of FIG. 11, as viewed by visitors of the marketplace website, will look similar to the item listing 800 illustrated in FIG. 8, as described above. Thus, since the listing generation system 200 is able to pre-fill a number of fields in the draft version of the item listing, the work load on the seller is greatly reduced.

Figure 12:
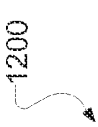
FIG. 12 illustrates an example of stock product information, according to various exemplary embodiments.

According to another aspect, after the identification module 202 identifies the product item that is the subject of the received text message (see 303 of FIG. 3 described above), the identification module 202 may enhance the draft version of the item listing based on stock information (e.g., a stock description or a stock photo) associated with the determined product item. For example, FIG. 12 illustrates an example of stock product information 1200 that may be accessed by the identification module 202 and the listing generation module 204. The stock product information 1200 identifies various products (e.g., Cola Can, Apl ePad, Batman comic #152, Audi R8 V10, etc.), and any available stock information (e.g., a stock description or a link to a stock photo) for these various products. Accordingly, after the identification module 202 identifies the product item that is the subject of the received text message (see 303 of FIG. 3 described above), the identification module 202 locates the identified product item in the stock product information 1200. If there is a match, then the identification module 202 may access the relevant stock description and/or stock photo, which may be utilized by the listing generation module 204 to supplement the draft version of the item listing 700. More specifically, the listing generation module 204 may pre-fill the description field 707 and photo field 710 of the draft version of the item listing 700 (see FIG. 7), based on the accessed stock description and stock photo. For example, if the identification module 202 identifies the product described in the received text message as the Apl ePad, then the identification module 202 may access the stock description and stock photo associated with this product from the stock product information 1200. The listing generation module 204 will pre-fill the description field 707 of the draft version of the item listing 700 with the stock description "Things come alive . . . ". Similarly, the listing generation module 204 will pre-fill the photo field 710 of the draft version of the item listing 700 with the stock photo accessed via the link "link-AplePad-stockpic". The stock product information 1200 may be stored in one or more data tables or similar data structures, which may be located in a data repository or database (such as database 206 illustrated in FIG. 2).

The draft version of the item listing 700 may include multiple pictures of the product item. Thus, one of the pictures in the item listing 700 may correspond to a photo included in the received text message (e.g., a photo 403 included in the received text message 400 in FIG. 4), while another one of the photos in the item listing 700 may correspond to a stock photo accessed from the stock product information 1200, as described above. It is also possible that the received text message may not include any photo of the product item, in which case the draft version of the item listing may include any available stock photos accessed from the stock product information 1200, as described above.

Figure 13:
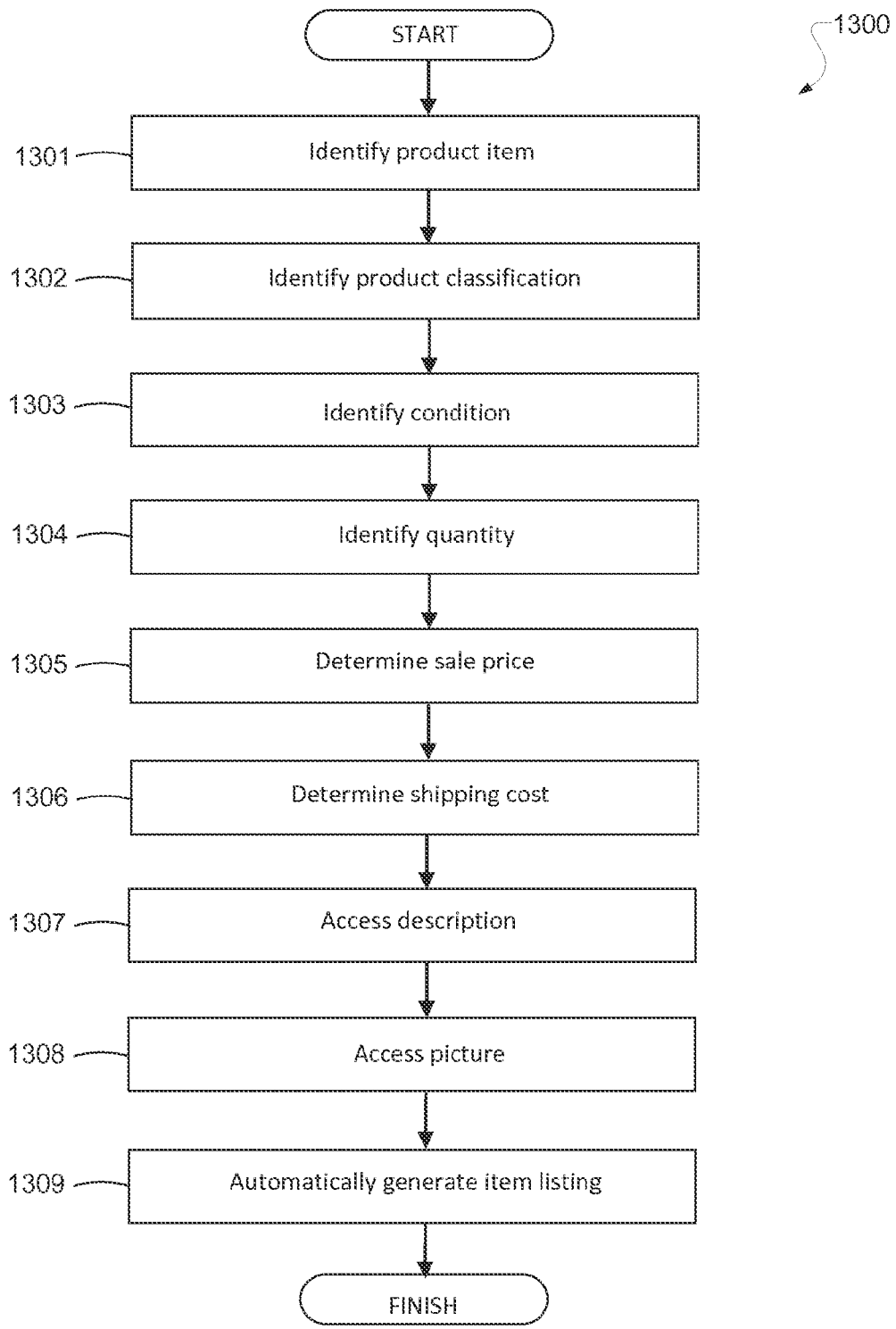
FIG. 13 is a flowchart illustrating an example method, according to various embodiments.

FIG. 13 is a flowchart illustrating an example method 1300, according to various embodiments described above. The method 1300 may be performed at least in part by, for example, the listing generation system 200 illustrated in FIG. 2 (or an apparatus having similar modules, such as client machines 110 and 112 or application server 112 illustrated in FIG. 1). The method 1300 may be performed after 302 (and replace 303 and 304) in FIG. 3. In 1301, the identification module 202 identifies the product item that is the subject of the received electronic text message, based on the content included in the electronic text message. In 1302, the identification module 202 identifies the product classification of the product item identified in 1301. For example, the identification module 202 may access product identification information 600 illustrated in FIG. 6.

In 1303, the identification module 202 identifies a condition of the product item, based on a condition keyword in the content of the electronic text message describing a condition of the product item. In 1304, the identification module 202 identifies a quantity associated with the product item, based on a quantity keyword in the content of the electronic text message describing a quantity associated with the product item. In 1305, the identification module 202 determines a sale price of the product item, based on the identification of the product item (in 1301) and suggested pricing information indicating a suggested sale price for the product item (e.g., see FIG. 10). In 1306, the identification module 202 determines a shipping cost of the product item, based on the identification of the product item (in 1301) and suggested pricing information indicating a suggested shipping cost for the product item (e.g., see FIG. 10). In 1307, the identification module 202 accesses a description of the product item. For example, the identification module 202 may retrieve the words included in the received text message that was received in 301 in FIG. 3. As another example, the identification module 202 may retrieve a stock description of the product item from stock product information (e.g., see FIG. 12). In 1308, the identification module 202 accesses a picture of the product item. For example, the identification module 202 may retrieve an electronic image of the product item from the received text message that was received in 301 in FIG. 3. As another example, the identification module 202 may retrieve stock photo of the product item based on stock product information (e.g., see FIG. 12).

In 1309, the listing generation module 204 automatically generates a draft version of an item listing that lists the product item as being for sale by the seller on a marketplace website. The listing generation module 204 may include, in the draft version of the item listing, one or more of the following: the title of the product item (identified in 1301); the product classification of the product item (identified in 1302); the condition of the product item (identified in 1303); the quantity of the product item (identified in 1304); the sale price of the product item (determined in 1305); the shipping cost of the product item (determined in 1306); the description of the product item (accessed in 1307); and a picture of the product item (accessed in 1308). Various elements of method 1300 may be omitted or rearranged.

Figure 14:
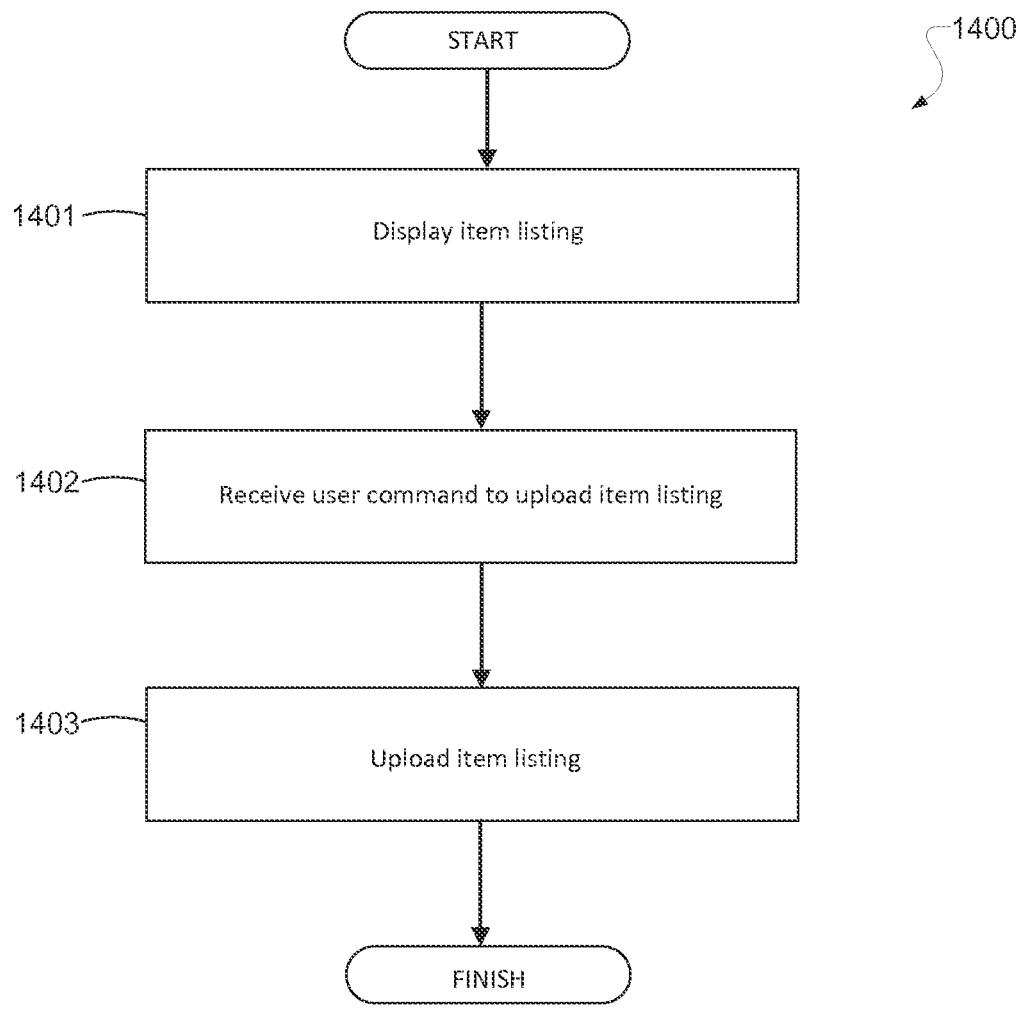
FIG. 14 is a flowchart illustrating an example method, according to various embodiments.

As described above, one manner in which the draft version of the item listing 700 (e.g., see FIG. 7) may be uploaded to the marketplace website as a complete item listing (e.g., see FIG. 8) is when the user is viewing the draft version of the item listing 700, and the user selects the "List It" button 708 (see FIG. 7). For example, FIG. 14 is a flowchart illustrating an example method 1400, according to various embodiments. The method 1400 may be performed at least in part by, for example, the listing generation system 200 illustrated in FIG. 2 (or an apparatus having similar modules, such as client machines 110 and 112 or application server 112 illustrated in FIG. 1). In 1401, the listing generation module 204 displays a draft version of an item listing. For example, the seller may log in to the listing generation system 200 by entering their user name and password into a user interface displayed by the listing generation system 200 on a client device of the user. FIG. 18a illustrates an example of such a user interface 1800. After the seller logs in, the listing generation system 200 may display a seller profile page 1801, as illustrated in FIG. 18b. If the user selects the "see my item listings" button in the user interface 1801, then the listing generation module 204 may display a draft version of an item listing associated with that seller, such as item listing 700 illustrated in FIG. 7. In 1402 in FIG. 14, the listing generation module 204 receives a user command to upload the item listing. For example the listing generation module 204 may detect the user selection of the "List It" button 708 in FIG. 7. In 1403 in FIG. 14, the listing generation module 204 uploads the item listing to the marketplace website an example of an uploaded item listing is illustrated in FIG. 8.

Another way in which a draft version of the item listing 700 (e.g., see FIG. 7) may be uploaded to the marketplace website as a complete item listing (e.g. see FIG. 8) may involve the listing generation system 200 transmitting a text message that includes information from the draft version of the item listing 700 to the seller. Thus, the seller does not even have to log in to the marketplace website or the listing generation system 200 via their computer to view the draft version of the item listing and request upload. Instead, the seller may confirm the information in the draft version of the item listing 700 and request upload by, for example, transmitting a reply message back to the listing generation system 200.

Figure 15:
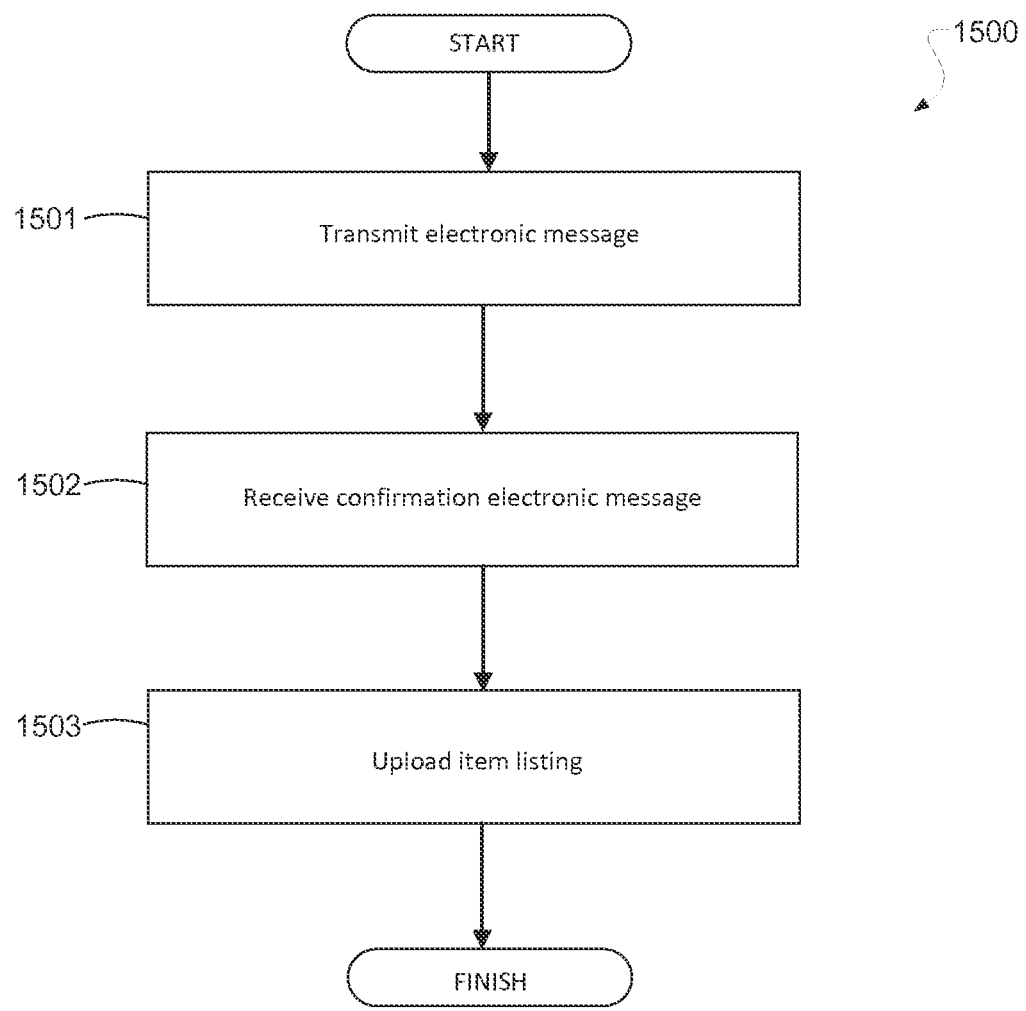
FIG. 15 is a flowchart illustrating an example method, according to various embodiments.
Figure 16:
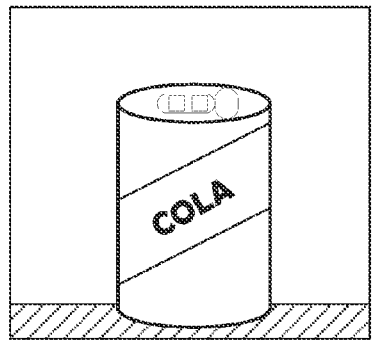
FIG. 16 illustrates an example of an upload query electronic text message, according to various embodiments.

For example, FIG. 15 is a flowchart illustrating an example method 1500, according to various embodiments. The method 1500 may be performed at least in part by, for example, the listing generation system 200 illustrated in FIG. 2 (or an apparatus having similar modules, such as client machines 110 and 112 or application server 112 illustrated in FIG. 1). In 1501, the listing generation module 204 transmits an "upload query" electronic text message to the seller (i.e., to the source telephone number 401 in FIG. 4, from which the original electronic text message was received in 301 in FIG. 3). The upload query electronic text message transmitted in 1501 may include information from the draft version of the item listing generated in 304 in FIG. 3 or 1309 in FIG. 13 (such as product title, product classification, quantity, condition, proposed shipping cost, proposed sale price, and so forth). For example, FIG. 16 illustrates an example of an upload query electronic text message 1600 received by a seller that this transmitted from a telephone number 1601 associated with the listing generation system 200. The electronic text message 1600 includes, in content 1602, information obtained from the draft version of the item listing 700A illustrated in FIG. 11. In 1502, the listing generation module 204 receives confirmation from the seller to upload the item listing identified in the upload query electronic text message transmitted in 1501. For example, the seller may reply to the upload query electronic text message 1600 by simply sending any reply to the message 1600, or by replying with a reply message that includes specific words such as "upload", "list", "ok", "yes", and so on. In 1503, the listing generation module 204 uploads the item listing to the marketplace website. An example of an uploaded item listing is illustrated in FIG. 8.

Figure 17:
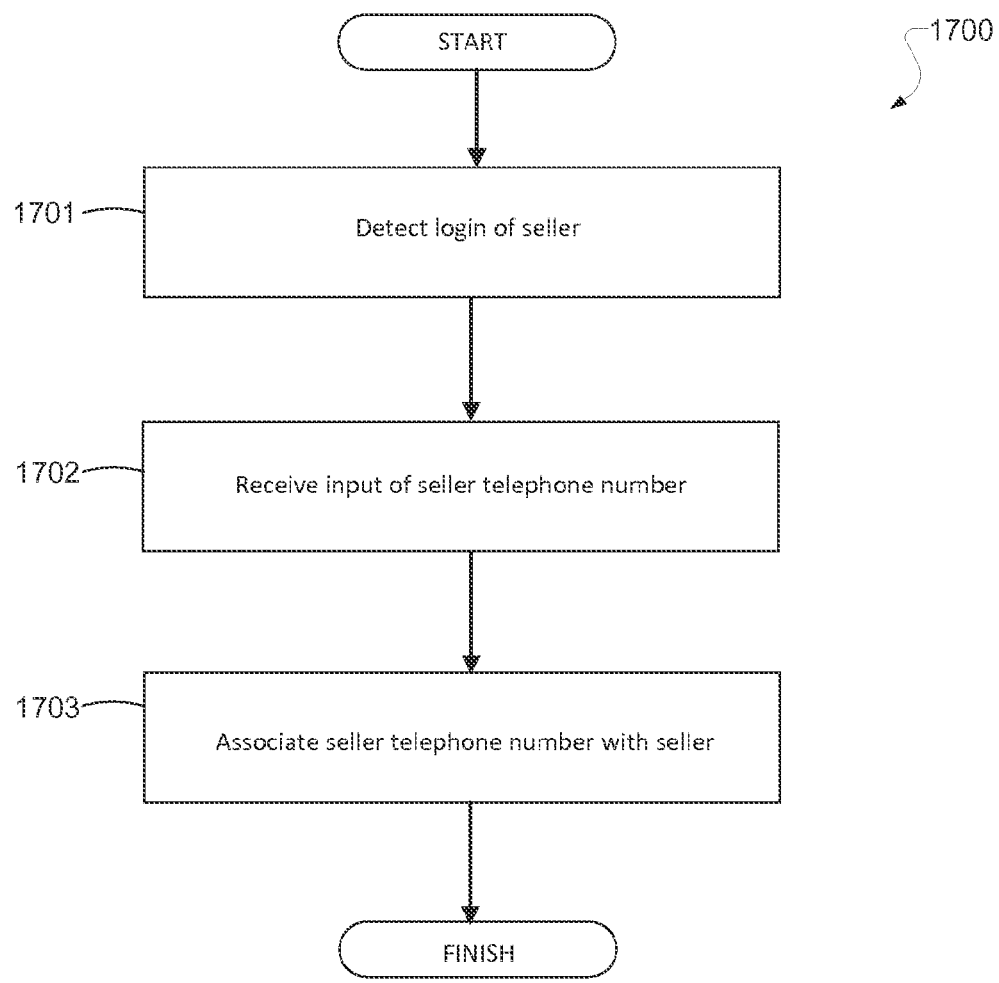
FIG. 17 is a flowchart illustrating an example method, according to various embodiments.

Referring back to FIG. 5, the identification module 202 may generate seller records 500 that identify seller telephone numbers of each of the sellers. For example, FIG. 17 is a flowchart illustrating an example method 1700, according to various embodiments. The method 1700 may be performed at least in part by, for example, the listing generation system 200 illustrated in FIG. 2 (or an apparatus having similar modules, such as client machines 110 and 112 or application server 112 illustrated in FIG. 1). In 1701, the identification module 202 detects user login of the seller into the marketplace website and/or the listing generation system 200. For example, the seller may enter their user name and password into a user interface that is displayed by the identification module 202. FIG. 18a illustrates an example of such a user interface 1800. After the seller logs in, the listing generation system 200 may display a seller profile page 1801, as illustrated in FIG. 181b. The seller profile page 1801 displays various information included in the seller record of the seller, such as username, name, telephone number, and address. If the telephone number of the seller is not already available in the seller record, the seller may enter their telephone number via the user interface 1801, as illustrated in FIG. 18*b*. Thus, in 1702, the identification module 202 receives user input of the seller telephone number. In 1703, the identification module 202 associates the seller telephone number received in 1702 with the seller. For example, the identification module 202 may update the seller record 500 associated with the seller to reflect the seller telephone number received in 1702.

The method 1700 may occur before the method 300. For example, before the seller Alice Smith transmits the electronic text message 400 (in 301 in FIG. 3), the method 1700 may be performed, so that the seller Alice Smith enters her telephone number "123-546-7890" via the user interface 1801, and the seller record for the seller Alice Smith reflects this seller telephone number, as illustrated in the seller records 500 of FIG. 5. Thus, when the electronic text message 400 from the source telephone number "123-456-7890" is received in 3011 in FIG. 3, the identification module 202 is able to identify the seller associated with this source telephone number, based on the seller records 500 of FIG. 5.

On the other hand, it is possible that the method 1700 may occur after the electronic text message is received. Put another way, it is possible that the seller Alice Smith may transmit the electronic text message 400 (in 301 in FIG. 3), before the seller telephone number of Alice Smith is available in the seller records 500. In such case, when the identification module 202 receives the electronic text message 400, the identification module 202 may be unable to determine a seller associated with the source telephone number "123-456-7890" of the electronic text message 400. According to an embodiment, the identification module 202 may store the received electronic text message 400 in a buffer (e.g., in database 206 in FIG. 2). Thereafter, when the seller Alice Smith logs into the listing generation system 200 via the user interface 1800 in FIG. 18*a*, the seller is presented with the user interface 1801 in FIG. 18*b* by which she can enter her seller telephone number, as described above in the method 1700. Accordingly, the identification module 202 is able to associate the received electronic text message 400 stored in the buffer with this seller Alice Smith, since the source telephone number of the received electronic text message 400 matches the seller telephone number of the seller Alice Smith now listed in the seller records 500. Thus, when the seller clicks on the "See my listings button" in FIG. 18*b*, the seller will be able to view the draft version of the item listing 700, as illustrated in FIG. 7.

Figure 19:
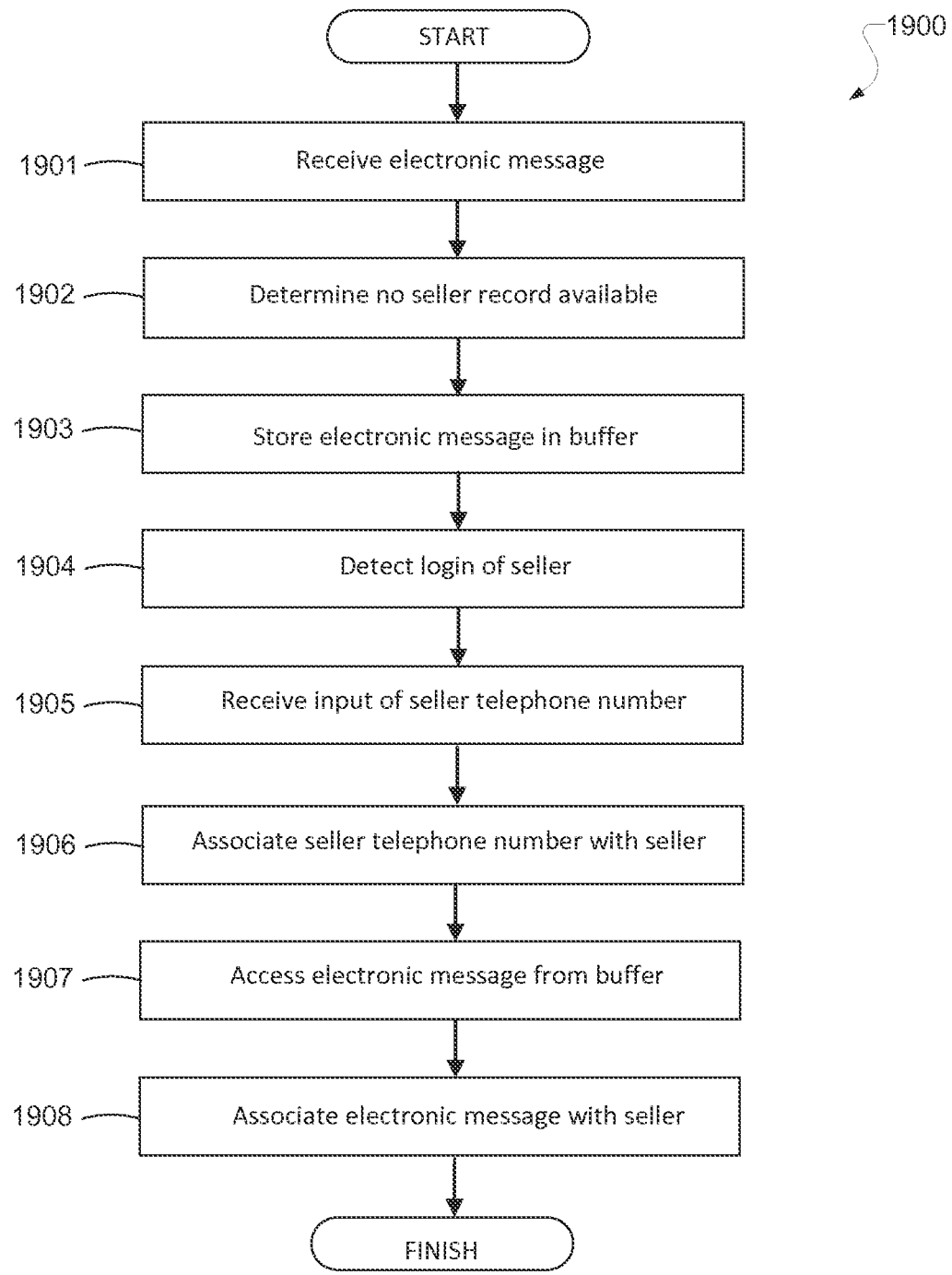
FIG. 19 is a flowchart illustrating an example method, according to various embodiments.

FIG. 19 is a flowchart illustrating an example method 1900, according to various embodiments. The method 1900 may be performed at least in part by, for example, the listing generation system 200 illustrated in FIG. 2 (or an apparatus having similar modules, such as client machines 110 and 112 or application server 112 illustrated in FIG. 1). In 1901, the identification module 202 receives an electronic text message from a source telephone number, the electronic text message including content describing a product item. In 1902, the identification module 202 determines that no seller record includes a seller telephone number matching the source telephone number of the received electronic text message. In other words, the identification module 202 is unable to identify a seller associated with the received electronic text message. In 1903, the identification module 202 stores the received electronic text message in a buffer. 1904 through 1906 are the same as 1701 through 1703 in FIG. 7. In 1907, the identification module 202 accesses the electronic text message from the buffer. In 1908, the identification module 202 determines that the source telephone number of the electronic text message matches the seller telephone number that was associated with the seller in 1906. Thus, the identification module 202 associates the electronic text message with the seller in 1908. Thereafter, the identification module 202 may generate the draft version of the item listing for the sale of the product item by the seller, as described in various embodiments throughout this disclosure.

While various embodiments of this disclosure describe electronic text messages such as SMS messages and MMS messages, it is apparent that the aspects of this disclosure may be applied to other types of electronic text messages or electronic messages. For example, the electronic text messages described throughout may in fact be instant messages transmitted between online user accounts. In such case, the seller/source telephone numbers described throughout may be replaced by seller/source usernames, while the predetermined telephone number associated with the listing generation system 200 may be replaced with a username associated with the listing generation system 200. As another example, the electronic text messages described throughout may in fact be e-mails transmitted between e-mail accounts. In such case, the seller/source telephone numbers described as described throughout may be replaced by seller/source e-mail addresses, while the predetermined telephone number associated with the listing generation system 200 may be replaced with an e-mail address associated with the listing generation system 200.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 20:
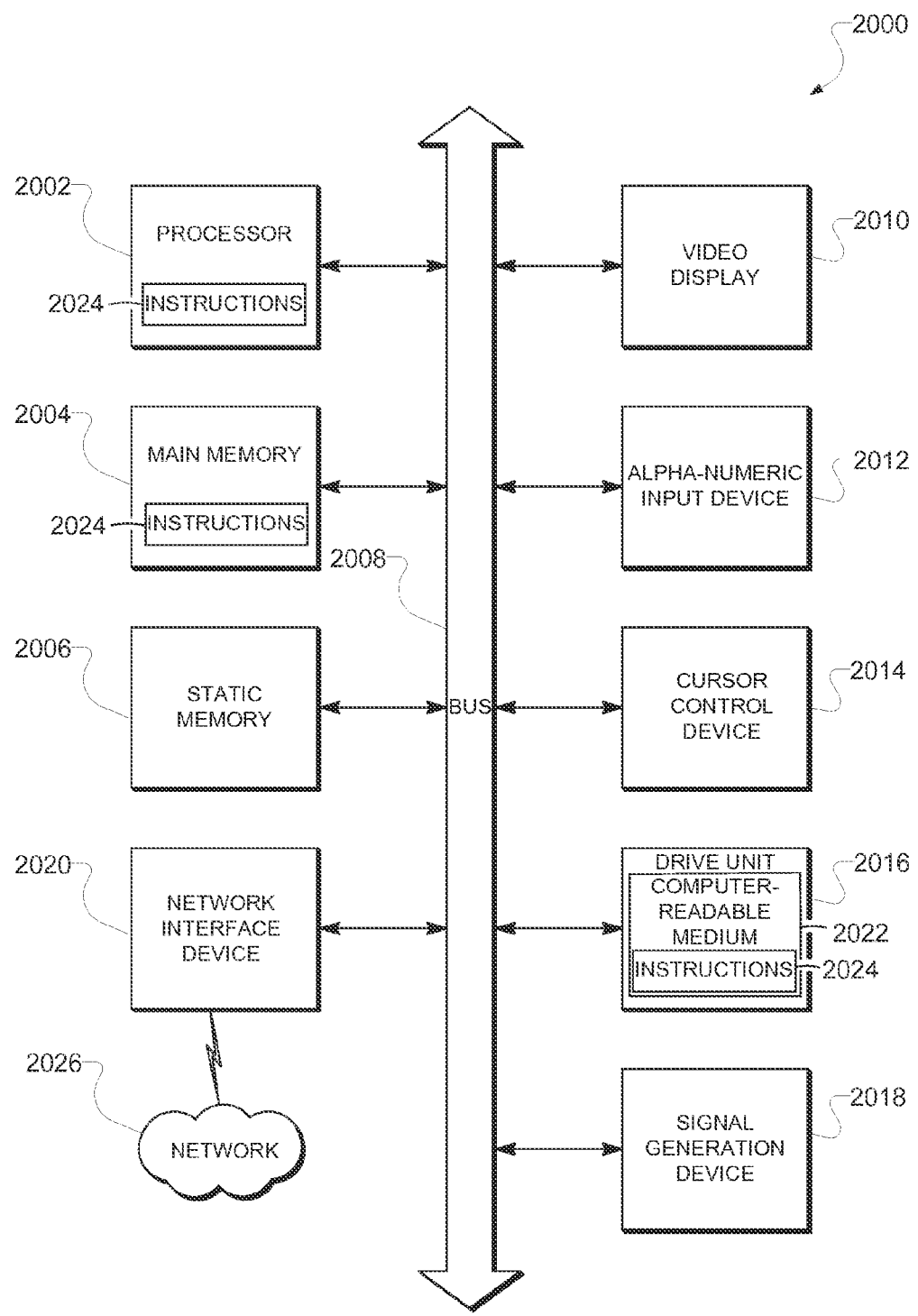
FIG. 20 is a diagrammatic representation of a machine in the example form of a computer system within which a set of instructions, for causing the machine to perform any one or more of the methodologies discussed herein, may be executed.

FIG. 20 is a block diagram of machine in the example form of a computer system 2000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2000 includes a processor 2002 (e.g., a central processing unit (CPU), a graphics processing unit (GPU) or both), a main memory 2004 and a static memory 2006, which communicate with each other via a bus 2008. The computer system 2000 may further include a video display unit 2010 (e.g., a liquid crystal display (LCD) or a cathode ray tube (CRT)). The computer system 2000 also includes an alphanumeric input device 2012 (e.g., a keyboard or a touch-sensitive display screen), a user interface (UIf) navigation device 2014 (e.g., a mouse), a disk drive unit 2016, a signal generation device 2018 (e.g., a speaker) and a network interface device 2020.

Machine-Readable Medium

The disk drive unit 2016 includes a machine-readable medium 2022 on which is stored one or more sets of instructions and data structures (e.g., software) 2024 embodying or utilized by any one or more of the methodologies or functions described herein. The instructions 2024 may also reside, completely or at least partially, within the main memory 2004 and/or within the processor 2002 during execution thereof by the computer system 2000, the main memory 2004 and the processor 2002 also constituting machine-readable media.

While the machine-readable medium 2022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 2024 may further be transmitted or received over a communications network 2026 using a transmission medium. The instructions 2024 may be transmitted using the network interface device 2020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   receiving an electronic text message from a source telephone number, the electronic text message including content describing a product item;
   identifying a seller of the product item, based on the source telephone number;
   comparing, by a processor of a machine, a keyword in the content of the electronic text message with a database of known keywords associated with candidate product items;
   detecting a match between the keyword and one of the known keywords that is associated with the product item;
   identifying the product item, based on the detection of the match;
   accessing stock product information for the product item; and
   generating a draft version of an item listing that lists the product item as being for sale by the seller on a marketplace website, wherein the item listing includes the stock product information.

2. The method of claim 1, wherein the identification of the seller comprises detecting a match between the source telephone number and a seller telephone number associated with the seller, the seller telephone number being included in a seller record corresponding to the seller.

3. The method of claim 2, wherein the seller record is generated by:
   detecting user login of the seller into the marketplace website;
   receiving user input of the seller telephone number via the marketplace website; and
   associating the seller telephone number with the seller.

4. The method of claim 3, wherein the receiving user input of the seller telephone number occurs after the receiving of the electronic text message and before the identifying of the seller.

5. The method of claim 1, wherein the item listing includes one or more of:
   identification in of the seller;
   a title of the product item;
   an image of the product item;
   product classification of the product item;
   a condition of the product item;
   a sale price of the product item; and
   a shipping cost of the product item.

6. The method of claim 1, further comprising:
extracting an electronic image of the product item from the content included in the electronic text message; and
including the electronic image of the product item in the item listing.

7. The method of claim 1, further comprising:
identifying an item condition of the product item, based on a condition keyword in the content of the electronic text message describing a condition of the product item; and
including the item condition in the item listing.

8. The method of claim 1, further comprising:
determining a sale price of the product item, based on the identification of the product item and suggested pricing information indicating a suggested sale price for the product item; and
including the sale price in the item listing.

9. The method of claim 1, further comprising:
determining a shipping cost of the product item, based on the identification of the product item and suggested pricing information indicating a suggested shipping cost for the product item; and
including the shipping cost in the item listing.

10. The method of claim 1, further comprising:
transmitting an electronic text message to the source telephone number requesting confirmation of information included in the item listing;
receiving a confirmation electronic text message from the source telephone number; and
uploading the item listing to the marketplace website.

11. The method of claim 1, further comprising:
displaying the item listing to the user via a user interface of the marketplace website;
receiving a user command to upload the item listing to the marketplace website; and
uploading the item listing to the marketplace website.

12. The method of claim 1, wherein the electronic text message is at least one of a Short Message Service (SMS) message, a Multimedia Messaging Service (MMS) message, and an instant message (IM).

13. An apparatus comprising:
a memory;
a processor coupled to the memory;
an identification module coupled to the processor and configured to:
receive an electronic text message from a source telephone number, the electronic text message including content describing a product item;
identify a seller of the product item, based on the source telephone number;
compare a keyword in the content of the electronic text message with a database of known keywords associated with candidate product items;
detect a match between the keyword and one of the known keywords that is associated with the product item;
identify the product item, based on the detection of the match; and
access stock product information for the product item; and
a listing generation module configured to automatically generate a draft version of an item listing that lists the product item as being for sale by the seller on a marketplace website, wherein the item listing includes the stock product information.

14. The apparatus of claim 13, wherein the identification module identifies the seller by detecting a match between the source telephone number and a seller telephone number associated with the seller, the seller telephone number being included in a seller record corresponding to the seller.

15. The apparatus of claim 13, wherein
the identification module is further configured to determine a sale price of the product item, based on the identification of the product item and suggested pricing information indicating a suggested sale price for the product item, and wherein
the listing generation module is configured to include the sale price in the item listing.

16. The apparatus of claim 13, wherein
the identification module is further configured to determine a shipping cost of the product item, based on the identification of the product item and suggested pricing information indicating a suggested shipping cost for the product item, and wherein
the listing generation module is configured to include the shipping cost in the item listing.

17. The apparatus of claim 13, wherein the listing generation module is further configured to:
transmit an electronic text message to the source telephone number requesting confirmation of information included in the item listing;
receive a confirmation electronic text message from the source telephone number; and
upload the item listing to the marketplace website.

18. A non-transitory machine-readable storage medium having embodied thereon instructions executable by one or more machines to perform operations comprising:
receiving an electronic text message from a source telephone number, the electronic text message including content describing a product item;
identifying a seller of the product item, based on the source telephone number;
comparing a keyword in the content of the electronic text message with a database of known keywords associated with candidate product items;
detecting a match between the keyword and one of the known keywords that is associated with the product item;
identifying the product item, based on the detection of the match;
accessing stock product information for the product item; and
automatically generating a draft version of an item listing that lists the product item as being for sale by the seller on a marketplace website, wherein the item listing includes the stock product information.

19. The method of claim 1, further comprising:
comparing a plurality of keywords in the content of the electronic text message with the database of known keywords associated with candidate product items;
detecting a plurality of matches between the keywords and the candidate product items; and
determining that the product item is a strongest match of the candidate product items.

20. The method of claim 19, wherein the determining that the product item is a strongest match of the candidate product items comprises determining that the product item has more known keywords that match the keywords in the content of the electronic text message in comparison with other product items.

* * * * *

UNITED STATES PATENT AND TRADEMARK OFFICE
CERTIFICATE OF CORRECTION

| | | |
|---|---|---|
| PATENT NO. | : 8,635,124 B1 | Page 1 of 1 |
| APPLICATION NO. | : 13/687807 | |
| DATED | : January 21, 2014 | |
| INVENTOR(S) | : Hamilton et al. | |

It is certified that error appears in the above-identified patent and that said Letters Patent is hereby corrected as shown below:

In the Claims

In column 18, line 61, in Claim 5, delete "in" and insert --information--, therefor In column 18, line 64, in Claim 5, before "product", insert --a--, therefor Signed and Sealed this
Nineteenth Day of August, 2014

Michelle K. Lee
*Deputy Director of the United States Patent and Trademark Office*